United States Patent Office 3,509,894
Patented May 5, 1970

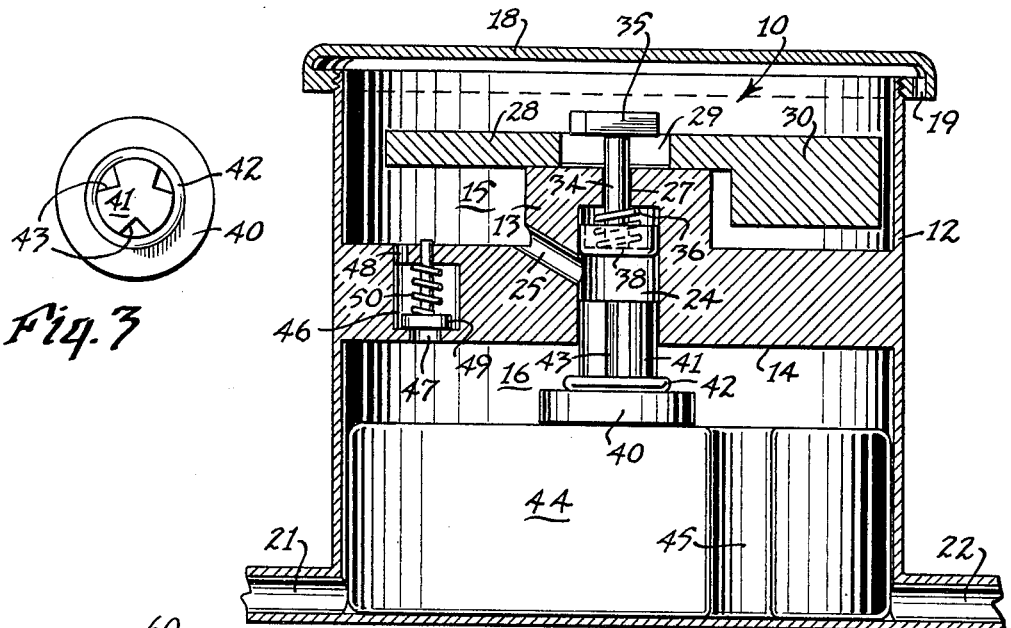
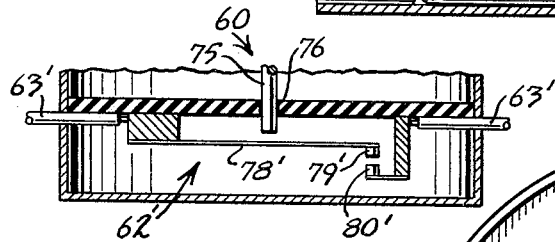
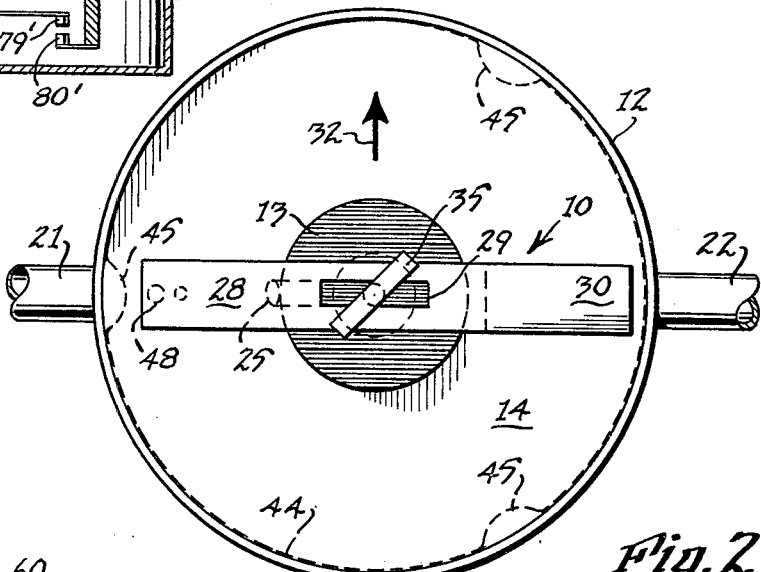
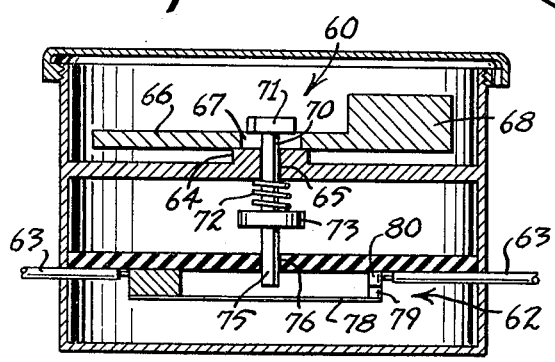

3,509,894
MOTION-ACTUATED SAFETY DEVICE
FOR VEHICLE
John F. Brooke, Rte. 4, Canton, Ga. 30114
Filed Feb. 16, 1968, Ser. No. 706,153
Int. Cl. H01h 35/02; G50b 9/00
U.S. Cl. 137—48                                    7 Claims

ABSTRACT OF THE DISCLOSURE

A safety device for a vehicle including an eccentrically weighted, transversely disposed, rotary member having a radial slot therein, a vertically movable plunger extending through the slot and having a radial latch thereon normally out of registry with the slot, and an operator element, such as a valve or electrical switch, controlled by the plunger, so that upon a sudden deceleration of the vehicle the eccentrically weighted rotary member is rotated to register the latch with the slot permitting the plunger and operator element to move to an operative position.

BACKGROUND OF THE INVENTION

This invention relates to a motion-actuated safety device for a vehicle and more particularly to a safety device which is actuated by the inertia of the eccentrically distributed mass of the rotary member.

In the field of motor vehicle safety, one of the more dangerous situations is the leakage and spreading of highly inflammatory motor fuel, together with a closed or short-circuited ignition circuit, in a wrecked vehicle. Sparks from the closed ignition circuit frequently ignite exposed or uncontained motor fuel causing a conflagration or explosion which compounds the threat to the safety of the occupants of the vehicle.

Many devices and mechanisms have been designed which will automatically close the fuel supply line or open the ignition circuit, or both, upon collision or overturning of the vehicle. One example of such a prior safety device is an upset-type mercury switch in which the switch contacts are normally immersed in the mercury, but the mercury flows away from one contact when the vehicle is overturned, to open the ignition circuit automatically. However, in order for such a mercury switch to operate, the vehicle must overturn or at least tilt. There have also been other types of safety device elements, which break upon collision to actuate a valve to close a fuel supply line or to open the ignition circuit. The difficulty with such frangible devices is that they are easily subject to damage prior to a collision, and once broken, are of no further use, and must be replaced.

SUMMARY OF THE INVENTION

This invention is directed to a safety device for a motor vehicle which is capable, upon abrupt deceleration, stopping or collision, to cause a plunger to move an operator element, such as a valve for closing a fuel tank or fuel supply line, or a link for opening the ignition switch or closing a relay switch, which in turn opens the ignition switch. The plunger is normally held in an inoperative position by a latch supported at a rotary angle to a mating slot in a rotary member having an eccentric mass. Upon a sudden deceleration of the vehicle, the eccentric mass causes the rotary member to rotate until the latch and slot are radially aligned, thus permitting the latch and the plunger to move in the axial direction of the plunger to operative position.

It is therefore an object of this invention to provide a motion-actuated safety device for a vehicle adapted to be connected to a variety of operator elements for carrying out various safety functions upon collision of a vehicle.

Another object of this invention is to provide a motion-actuated safety device which is adapted to automatically and immediately react upon a predetermined deceleration of the vehicle to carry out a predetermined safety function, whether or not the vehicle overturns.

A further object of this invention is to provide a motion-actuated safety device for a vehicle which is capable of being reset and reused after it has been actuated accidentally or actuated in carrying out its intended function.

A further object of this invention is to provide a motion-actuated safety device which can be constructed and assembled with a minimum number of rugged parts and with a minimum of time, labor and expense.

BRIEF DESCRIPTION OF THE DRAWINGS

FIG. 1 is a vertical cross-sectional view of the device made in accordance with this invention in inoperative position and in association with a vapor vent housng for a vehicle fuel tank;

FIG. 2 is a top plan view of the device disclosed in FIG. 1 with the housing cover removed;

FIG. 3 is a top plan view of the float valve disclosed in FIG. 1;

FIG. 4 is a vertical sectional elevation of a modification of the invention associated with a normally closed electrical switch; and FIG. 5 is a fragmentary vertical sectional view of the lower portion of the device disclosed in FIG. 4, but associated with a normally open electrical switch.

DESCRIPTION OF THE PREFERRED EMBODIMENT

One example of the safety device 10 made in accordance with this invention is disclosed in FIGS. 1 and 2, in association with a vapor vent housing 12 communicating with a vehicle gasoline tank, not shown.

The base 13 of the safety device 10 constitutes a raised portion of a horizontal partition wall 14 dividing the housing 12 into an upper chamber 15 and a lower or float chamber 16. The top of the upper chamber 15 is open, but normally coverd by a threaded cap 18 having peripheral apertures, such as 19, to permit constant vapor communication between the upper chamber 15 and the atmosphere.

The float chamber 16 communicates with the gasoline tank, not shown, through tubes 21 and 22, connected to the top of the gasoline tank at remote ends thereof. Thus, there is always vapor communication between at least one end of the top of the gasoline tank and the float chamber 16, even if the tank is tilted.

Formed upwardly through the center of the bottom of the partition wall 14 is a cylindrical valve chamber 24. This valve chamber 24 extends upwardly into the base 13 of the safety device 10. An open port or conduit 25 extends through the partition wall 14 and communicates the upper chamber 15 with the middle portion of the valve chamber 24.

Thus, under normal operating conditions, and with the port 25 open, there is continuous communication between the top of the gasoline tank and the atmosphere through either of the tubes 21 or 22, float chamber 16, valve chamber 24, port 25, upper chamber 15 and the cap apertures 19. In this manner, gasoline vapors may escape from the gasoline tank to the atmosphere, and air may be supplied from the atmosphere to the gasoline tank as the gasoline is consumed.

In order to close the port 25 so that no gasoline will escape from the housing 12 upon an abrupt deceleration of the vehicle, and particularly upon collision of the vehicle, a safety device 10 is incorporated with the housing 12 in order to automatically close the port 25.

Extending vertically through the base 13 from the valve chamber 24 to the upper housing 15 is a cylindrical plunger guide opening 27. Resting on top of the base 13 is an eccentric member, such as eccentric arm 28, having a rotary axis substantially coincidental with the vertical axis of the guide opening 27 and having an elongated latch slot 29 extending radially of the rotary axis. As indicated by the relative dimensions and the enlarged end portion 30 of the eccentric arm 28, in the drawings, the center of mass of the eccentric arm 28 is radially spaced from its rotary axis. The enlarged portion 30 may merely be a greater mass of the same uniform material constituting the eccentric arm 28, or it may be weighted with a material heavier than the material constituting the remaining portion of the arm 28. Moreover, in its normal inoperative position, the line of centers, extending through the rotary axis and the center of mass of the eccentric member 28, which would be the longitudinal axis of the eccentric arm 28 in this case, is disposed substantially transversely to the axis of the forward motion of the vehicle, indicated by the arrow 32 in FIG. 2.

Extending through the guide opening 27 and the middle of the latch slot 29 for vertical reciprocable movement is a plunger 34. Formed on the top of the plunger 34 is an elongated radially disposed latch 35 of substantially the same horizontal configuration as, and adapted to register and be received within, the latch slot 29, when the latch 35 and slot 29 are radially oriented in operative position. In the inoperative position disclosed in FIGS. 1 and 2, the latch 35 is radially dis-oriented with the slot 29 and disposed at a sufficient angle to extend across the top of the slot 29 and rest upon the arm 28.

A coil spring 36 is disposed around the plunger 34 and within the valve chamber 24 and is maintained in compression against the top of the valve chamber 24 to bias the plunger 34 downward. The value of compression of the spring 36 must be great enough to hold the latch 34 in sufficient frictional engagement with the top of the eccentric arm 28 so that the eccentric arm 28 will not rotate under normal stopping and decelerating conditions, but will yield under extraordinary deceleration, and particularly in the event of collision.

As disclosed in FIG. 1, the bottom of the plunger 34 is fixed to, or forms, a cylindrical valve 38 adapted to reciprocate in sealing engagement with the wall of the valve chamber 24, and when depressed to operative position, will close the port 25. As disclosed in the drawings, the coil spring 36 is maintained in compression against the top of valve chamber 24 by the valve 38 in inoperative position.

It will thus be seen that when the vehicle attains a deceleration value sufficient to overcome the frictional engagement between the bottom of the latch 35 and the top of the eccentric arm 28, the weighted end 30 of the eccentric arm 28, or more accurately, the eccentric center of mass of arm 28, will continue at the constant velocity of the vehicle prior to deceleration to rotate the eccentric arm 28 about its rotary axis in a counter-clockwise direction as viewed in FIG. 2. When the rotary movement of the eccentric arm 28 has produced radial alignment of the slot 29 with the latch 35, the latch 35 will immediately drop into the slot 29, by virtue of not only gravity, but the expanding coil spring 36. The plunger 34 is thus forced down to move the valve 38 down across the port 25 to closed position. Therefore, any gasoline, or other liquid fuel, which finds its way from the tank through either of the tubes 21 and 22 into the lower float chamber 16 and valve chamber 24 will be automatically cut off from the upper chamber 15.

The vapor vent housing 12 may also be provided with a cylindrical float valve 40 having an upwardly projecting valve stem 41 and a sealing ring 42. The valve stem 41 is provided with circumferentially spaced, vertical, vent grooves 43 to permit the escape of gasoline vapors and also the introduction of air through the valve chamber 24, when the float valve 40 is normally in its lower open position. Supporting the float valve 40 within the float chamber 16 is a large float disc 44 also having circumferentially spaced vent channels 45 to permit the free passage of fuel vapors and air. Should an excess of liquid fuel enter the float chamber 16 through either of the tubes 21 or 22, such as when the gasoline tank is tilted, which in turn might be caused by an unusual parking angle or by the vehicle being stuck in a ditch, the rising level of the liquid in the float chamber 16 forces upward not only the float disc 44, but also the float valve 40, causing the valve stem 41 to close the port 25 and the sealing ring 42 to seal off and close the bottom of the valve chamber 24.

Since no further gasoline vapors can escape through the valve chamber 24 and port 25, a safety relief valve chamber 46 may be formed through the partition wall 14 having a lower valve port 47 and an upper vent 48. The relief valve 49 is received in the relief valve chamber 46 and biased to close the lower valve port 47 by the spring 50. The value of the spring 50 is such that only excessive vapor pressures within the float valve chamber 16 will force the relief valve 49 to open position so that vapors can escape through the valve port 47, chamber 46, upper vent 48 and into the upper chamber 15.

If desired, the frictional engagement between the latch 35 and the top of the eccentric arm 28 may be improved by providing inter-engaging radial teeth in the opposing surfaces of the latch 35 and arm 28. The degree of friction between the latch 35 and the arm 28 will depend upon the desired deceleration value of the vehicle at which actuation of the device 10 is desired. Moreover, the degree of frictional engagement between the latch 35 and the arm 28 will also depend upon the mass of the arm 28 and the distance of the center of mass from the rotary axis of the arm 28, as well as the value of compression in the spring 36.

FIG. 4 discloses another form of safety device 60 similar in construction and function to safety device 10, but adapted to open a safety switch 62 in an electrical circuit or conduit, such as ignition circuit 63. The base 64 of the device 60 includes a plunger guide 65. Mounted on top of the base 64 is an eccentric arm 66 having a rotary axis coinciding with the axis of the plunger guide 65 and having an elongated slot 67 radially extending from the rotary axis. One end 68, specifically the right end in FIG. 4, of the eccentric arm 66 is weighted, or comprises an enlarged mass, to provide an eccentric center of mass spaced radially from the rotary axis of the arm 66. Extending vertically through the guide 65 and latch slot 67 for reciprocable movement is the plunger 70 having a radially extending elongated latch 71 adapted to register with the slot in operative position, in the same manner as the latch 35 and slot 29 of the safety device 10.

Beneath the base 64 a coil spring 72 around the plunger 65 is compressed between the base 64 and an annular flange 73 formed on the plunger 70 in order to bias the plunger 70 downward.

Extending below the flange 73 is a plunger projection 75 extending through a projection guide 76 for vertical reciprocable movement. The plunger projection 75 is disposed above and in vertical alignment with a transverse switch arm 78 normally supporting a movable contact 79 in electrical engagement with a stationary contact 80 in the ignition circuit 63.

As disclosed in FIG. 4, the device 60 is in inoperative position, with the latch 71 dis-oriented from the latch slot 67, so that the plunger 70 is in raised position, comparable to the inoperative position of the latch 35 in FIGS. 1 and 2. When the vehicle carrying the device 60 decelerates to the desired value, or stops abruptly, or collides, the eccentric arm 66 will be rotated in the same manner as the eccentric arm 28 until the latch 71 registers and drops into the latch slot 67. Simultaneously the plunger 70 drops, causing the plunger projection 75 to engage and force down the switch arm 78 to break engagement between contacts 79 and 80 and immediately and automatically open the ignition circuit 63.

FIG. 5 discloses a slight modification in the switch 62' in which the stationary contact 80' is mounted below the movable contact 79' so that when the plunger projection 75 of the safety device 60 moves down to its operative position, the projection 75 forces the switch arm 78' downwardly to engage contacts 79' and 80' and thereby close the normally open safety switch 62'. The switch 62' might be used in a solenoid circuit 63' for energizing a solenoid, not shown, which in turn would open a switch in the ignition circuit.

It will be observed that regardless of where the safety devices 10 and 60 are used, they are made of a minimum number of parts which could be quite strong and rugged and require little or no maintenance. Furthermore, in the event that either of the devices 10 or 60 are inadvertently actuated, they may be readily reset to their inoperative position for reuse without damage to the device.

Furthermore, it will be noted that eccentric arms 28 and 66 are disposed in a substantially horizontal plane, so that only a reduction in velocity of the forward movement of the vehicle to the desired degree or value is necessary to actuate the device. In other words, the device 10 or 60 will actuate whether the vehicle overturns or not, so long as the forward progress of the vehicle is abruptly decelerated or stopped.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A motion-actuated safety device for a vehicle having an axis of forward motion, comprising:
   (a) a base fixed to said vehicle,
   (b) a plunger guide in said base having a vertical axis,
   (c) an eccentric member having a rotary axis and a center of mass spaced radially from said rotary axis,
   (d) a latch slot in said eccentric member extending radially from said rotary axis,
   (e) said eccentric member resting against said base with said rotary axis coinciding with the vertical axis of said plunger guide, and the line-of-centers including said rotary axis and said center of mass being disposed substantially transversely of said forward motion axis in inoperative position,
   (f) a plunger received for vertical reciprocable movement through said plunger guide and said latch slot,
   (g) a latch projecting radially from said plunger and adapted to register with said slot in operative position, said latch being radially dis-oriented with said slot and on the opposite side of said eccentric member from said base in inoperative position,
   (h) spring means associated with said plunger for biasing said plunger vertically toward operative position,
   (i) a conduit,
   (j) a conduit closure adapted to be moved by said plunger to open and close said conduit,
   (k) the angular disposition of said latch relative to said slot in inoperative position being such that when said vehicle decelerates abruptly in its forward movement, the continued forward motion of said center of mass will rotate said slot to register with said latch causing said plunger to move said conduit closure.

2. The invention according to claim 1 in which said conduit comprises a fluid port, and said conduit closure comprises a valve adapted to open and close said port.

3. The invention according to claim 2 further comprising a vapor vent housing, said base forming a partition dividing said housing into an upper chamber and a lower chamber, said lower chamber communicating with the fuel tank of said vehicle, said fluid port extending through said base to communicate said upper and lower chambers.

4. The invention according to claim 3 in which said eccentric member and latch are disposed in said upper chamber, and further comprising atmospheric vents in said upper chamber.

5. The invention according to claim 4 further comprising a float in said lower chamber and a float valve adapted to be actuated by said float upon a predetermined level of liquid in said lower chamber to close said fluid port, when said valve is in open position.

6. The invention according to claim 5 further comprising a vertical valve chamber in said base, said fluid port communicating said valve chamber with said upper chamber, said valve being disposed above said fluid port in said valve chamber in inoperative position, and said float valve being disposed in said valve chamber below said fluid port in inoperative position.

7. The invention according to claim 1 in which said conduit comprises an electrical circuit, and said conduit closure comprises an electrical switch for opening and closing said circuit.

References Cited

UNITED STATES PATENTS

| | | | |
|---|---|---|---|
| 1,842,430 | 1/1932 | Spohr | 137—38 |
| 2,163,988 | 6/1939 | Stacey | 137—38 |
| 2,273,058 | 2/1942 | Miller | 180—104 |
| 3,083,862 | 4/1963 | Bowden | 220—44 |

A. HARRY LEVY, Primary Examiner

U.S. Cl. X.R.

137—38; 180—104; 200—61.45